UNITED STATES PATENT OFFICE.

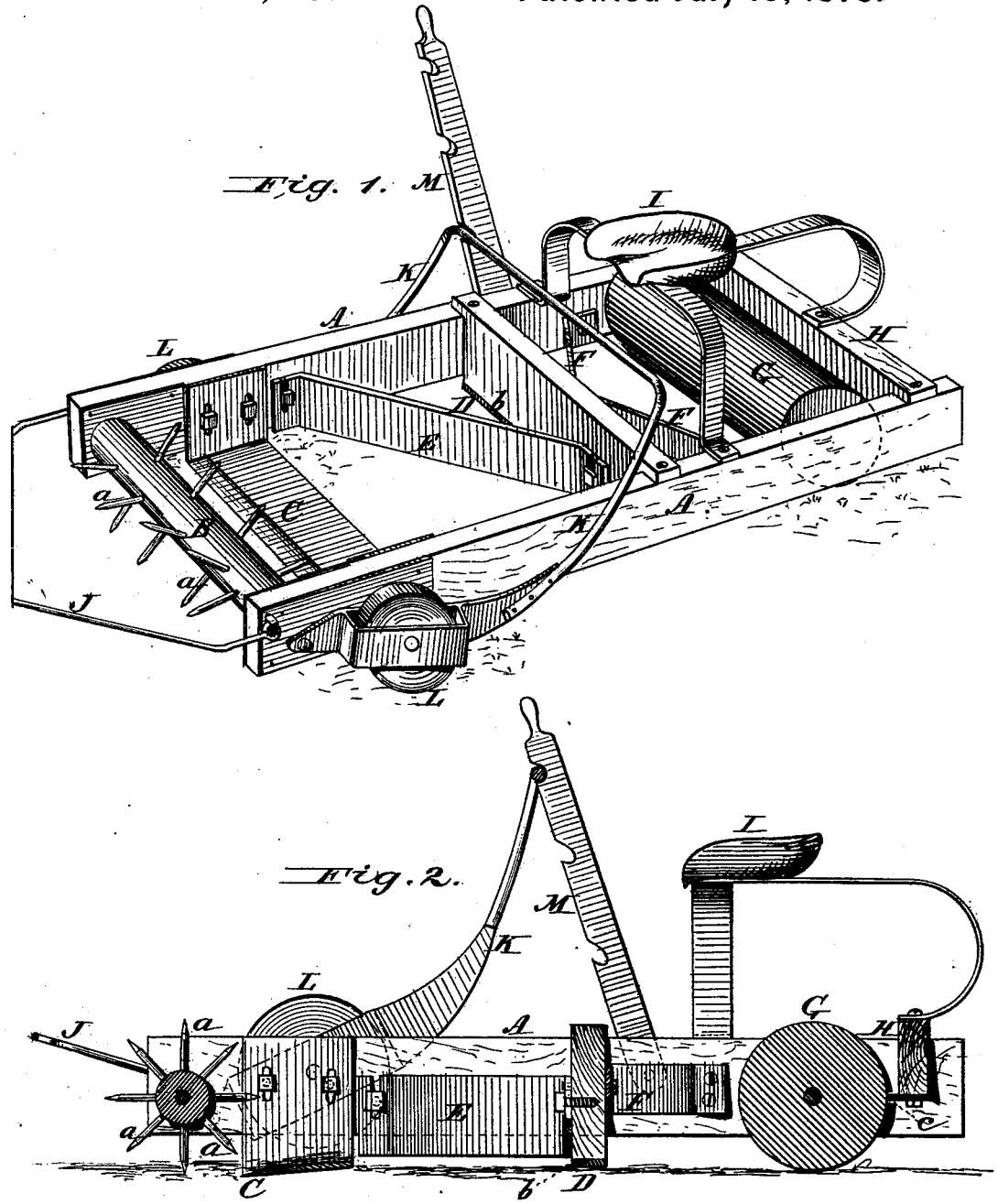

BENJAMIN C. MEGQUIER, OF OSAGE, IOWA.

IMPROVEMENT IN ROAD-GRADERS.

Specification forming part of Letters Patent No. 206,120, dated July 16, 1878; application filed May 27, 1878.

*To all whom it may concern:*

Be it known that I, BENJAMIN C. MEGQUIER, of Osage, in the county of Mitchell and State of Iowa, have invented certain new and useful Improvements in Road-Graders; and do hereby declare that the following is a full, clear, and exact description of my invention, which will enable others skilled in the art to which it appertains to make and use the same, reference being had to the accompanying drawings, and to letters of reference marked thereon, which form a part of this specification.

I have improved the machine for grading and leveling roads.

It consists of a strong frame carrying a revolving pick at its front to loosen the earth, a cross knife or blade in rear of the pick to cut under the surface and leave the earth in condition to receive the action of a scraper, and, finally, the compressing action of a rear roll, leaving the surface even and pressed.

A share or wing may be used between the cross-knife and the scraper to carry the loose earth to one side, or to fill wheel-ruts. The front of the machine is raised and lowered by a lever device with side wheels, to carry the knife the proper depth in the ground, and to raise it above the surface, as may be required.

The machine is designed especially for repairing roads, streets, and for grading, and is constructed in a manner to do its work effectively and with comparatively little labor and expense.

Referring to the drawings, Figure 1 represents a perspective view of my improved machine, and Fig. 2 a vertical section of the same.

The frame consists of two side beams, A, of suitable length, firmly united together by cross-pieces, making a low long frame, carrying at its front a cross-shaft, B, filled with pointed teeth or spikes *a*, which dig into the surface as the machine is drawn forward, and is thereby automatically revolved, and breaks and loosens the earth, which is then cut under by a cross blade or knife, C, having its ends turned upward and secured to the inner sides of the beams, so that the knife projects below them, leaving the earth loosely broken to receive the leveling action of a scraper, D, secured across the frame at about the middle of its length, and formed by a cross-piece shod with a steel or iron plate, *b*, and projecting a suitable distance below said side beams.

Between the blade or knife and the scraper I arrange a share or wing, E, extending from near one end of the blade obliquely across to or near the opposite end of the scraper, to carry the earth to one side in filling wheel-ruts or for removal. This wing is made removable when working on a level surface and it is not desired to turn the earth to one side. The scraper is braced at its rear by a double brace, F, secured to the side beams, and an iron roll, G, is arranged at the rear of the frame to press and smooth the surface. A scraper, *c*, is carried by the rear cross-piece H in position to keep the surface of the roll free from clogging. A driver's seat, I, is arranged over the roll, and the machine is drawn by a pole or tongue attached to a bail J, secured to the front ends of the beams, to keep the team from being injured by the front revolving pick.

The cross knife or blade and the pick are raised and lowered, to suit the work to be done or to raise them out of the ground, by means of a lever device, K, crossing the frame, and pivoted at its front ends outside of and near the front ends of the side beams, and carrying at each side a wheel, L, which, when the lever is depressed, bears upon the ground and elevates the front of the machine.

When adjusted, the lever is held by a pivoted catch-bar, M, at the side of the frame, and both the lever device and its holding-bar are within the reach of the driver, so that he can control the adjustment of the machine for work, or for carrying the machine to and from work.

The blade or knife C and the share or wing E are provided with slots for their fastening-bolts, whereby they can be adjusted vertically, as may be desired.

I claim—

1. The grading and leveling machine consisting of the front pick B *a*, the cross blade or knife C, the cross-scraper D, and the rear pressing and hardening roll G, all constructed and arranged to operate substantially as herein set forth.

2. In combination with the front pick, the cross blade or knife, and the cross-scraper, the intermediate wing or share E, for the purpose specified.

In testimony that I claim the foregoing I have affixed my signature in the presence of two witnesses.

BENJAMIN C. MEGQUIER.

Witnesses:
T. J. A. FENN,
J. HENRY SWENEY.